United States Patent [19]

Enge

[11] 4,393,441

[45] Jul. 12, 1983

[54] HIGH VOLTAGE POWER SUPPLY

[76] Inventor: Harald A. Enge, 26 Prince Ave., Winchester, Mass. 01980

[21] Appl. No.: 284,483

[22] Filed: Jul. 17, 1981

[51] Int. Cl.³ .............................................. H02M 7/10
[52] U.S. Cl. ....................................... 363/61; 363/126
[58] Field of Search ...................................... 363/44–48, 363/59–61, 67–70, 126; 307/110; 320/1

[56] References Cited

U.S. PATENT DOCUMENTS

| | | | |
|---|---|---|---|
| 3,505,608 | 4/1970 | Enge | 336/170 |
| 3,543,136 | 11/1970 | Enge | 363/61 |
| 3,596,167 | 7/1971 | Enge | 363/61 |

FOREIGN PATENT DOCUMENTS 1130082 10/1968 United Kingdom .................. 363/59

Primary Examiner—William M. Shoop
Assistant Examiner—Peter S. Wong
Attorney, Agent, or Firm—Robert F. O'Connell

[57] ABSTRACT

A modified double Greinacher high voltage power supply wherein the side-string capacitances thereof have an inductance associated in series therewith, the inductance/capacitance circuits being appropriately tuned to the frequency of the R-F input voltage source. Preferably the center-string capacitance may have an inductance associated in series therewith, such circuit being similarly tuned. The input R-F voltage, rather than being supplied as a sine wave is supplied substantially as a square wave to the first stage and is transmitted to each of the subsequent stages substantially as a square wave.

14 Claims, 6 Drawing Figures

HIGH VOLTAGE POWER SUPPLY

INTRODUCTION

This invention relates to the generation of high voltages and, more particularly, to power supplies which provide relatively high DC output voltages utilizing primary alternating current input sources having relatively high frequencies.

BACKGROUND OF THE INVENTION

High voltage generators or power supplies for producing DC voltages which may lie in ranges from tens of kilovolts to megavolts, are used in a number of applications in various fields of technology. Typical output currents lie in the range from microamperes to hundreds of milliamperes. For example, such high voltage sources may be used in providing power for X-ray generators, nuclear accelerators, electrostatic precipitators, sophisticated medical electronic devices, such as CT scanning equipment, and the like. Well-known high voltage sources of the prior art which have found use in many applications include transformer power supplies, Van de Graaff generators, and rectifier multiplier chain circuits often designated as Cockroft-Walton generators or Greinacher circuits. Later modifications of the latter circuits use a dual chain of rectifier/multiplier circuits, wherein each stage comprises a bridge rectifier, the rectifiers thereof being separated by capacitances. The input is supplied by an R-F source via a transformer having a center-tapped secondary, the ends of the secondary being connected to the side chains of circuit capacitors and the center tap thereof being connected to the center chain of capacitors.

One of the problems with the original Greinacher circuit, and somewhat less pronounced in dual chain configurations thereof, is that the effective internal impedance is relatively high and increases as the number of stages thereof increases (essentially as the cube of the number of stages). A high effective internal impedance produces an undesirable voltage loss along the circuit severely limiting the power output of the supply. All rectifier circuits, and particularly multiplier circuits, produce undesirable ripple voltages (the ripple being essentially proportional to the square of the number of stages). As the number of stages increases, the capacitance values must be increased to reduce the ripple as well as to keep the overall voltage drop low. The need for relatively large capacitors means that the stored energy in the circuit cannot be minimized, as is desirable in such high voltage circuits. Moreover, should the load be temporarily shorted out, as sometimes occurs in the environment in which such voltage supplies are used, a large amount of stored energy will be substantially immediately released to produce relatively powerful sparks with attendant substantial damage.

Attempts to overcome the disadvantages of conventional rectifier/multiple circuit arrangements have been made, as shown in U.S. Pat. No. 3,505,608 issued on Apr. 7, 1970 to H. A. Enge and U.S. Pat. No. 3,543,136 issued on Nov. 24, 1970, such devices often being referred to as transmission-line generators and in U.S. Pat. No. 3,596,167 issued on July 27, 1971 to H. A. Enge and sometimes referred to as the Deltatron (a trademark of High Voltage Engineering Corporation, Burlington, Mass.) configuration.

Both types of high voltage supplies utilize a primary source of moderately high frequency (typically 50–100 kHz). Both supplies transport power along a stack of inductor-capacitor units by inductive coupling between coils in each unit. In each unit part of the power is withdrawn and rectified to produce DC outputs connected in series from unit to unit.

A principal reason for using a high-frequency primary power source of high-voltage generation is to reduce the bulk and expense of the components, capacitors and inductors in the rectifier unit or units. Moreover, a high frequency supply has a relatively short response time and is, therefore, relatively easy to regulate. For instance, a one-million volt Deltatron unit which has been built has a stability of better than one part in 100,000. Finally, since it is important in some applications, at least, to minimize the stored energy in the high voltage generator (e.g., when high voltage breakdown is likely to occur in the load), the energy extractable from the power source under breakdown conditions should preferably be small. The use of smaller capacitors in such high frequency units reduces the extractable stored energy.

One of the problems in the transmission line configuration of the aforesaid U.S. Pat. No. 3,505,608 which uses a traveling wave is that, in order to avoid reflections producing a standing wave, the transmission line must be terminated by its characteristic impedance or the traveling wave must be transmitted in the reverse direction along a separate chain to ground. In the first case a relatively large amount of power is wasted and excessive heating is produced in the terminating resistance. In the second case the extra chain of inductors, capacitors, and possibly also rectifiers, doubles the complexity of the device.

The transmission line configuration of the aforesaid U.S. Pat. No. 3,543,136 attempted to overcome the disadvantages of traveling wave transmission line generators by using a standing wave and withdrawing the power at or close to the antinodes. However, if the standing wave configuration is in the form of a relatively long chain or stack (i.e., a large number of stages), the tolerance requirements for the electrical components become excessively stringent.

In the aforesaid Deltatron generator a plurality of air-core transformer stages are capacitively coupled in a cascade configuration and are connected to rectifier-multipliers, also formed in a chain, so as to produce the overall DC voltage output. The capacitance values which couple the various stages must be appropriately selected to provide both series and parallel resonance conditions. The overall configuration thereby becomes very critical in its tuning capabilities. In many applications the need for such critical tuning becomes impractical to achieve, particularly for a relatively long stack.

It, therefore, becomes desirable to provide a simpler solution to the problems that arise in the basic Cockroft-Walton or Greinacher rectifier-multiplier chain circuitry and in the alternative configurations heretofore suggested by those in the art. Such solution must provide an adequate voltage output (i.e., adequate power) at a relatively reasonable cost using a relatively simple circuit configuration which can be readily fabricated.

BRIEF SUMMARY OF THE INVENTION

In accordance with the invention, a double-chain of Greinacher circuits which are appropriately modified according to the principles of the invention are utilized. In a preferred embodiment thereof, for example, each of the capacitances of the Greinacher circuit have an inductance associated in series therewith, the series L-C circuits so formed each being appropriately tuned to the input frequency of the R-F input voltage source. Further, the input R-F voltage, rather than being supplied as a sine wave, is supplied as a square wave to the first stage and, in a manner explained below, transmitted to each of the subsequent stages substantially as a square wave.

The use of such inductance-capacitance tuned circuits, together with a square wave input substantially reduces the internal impedance or, conversely, allows for the use of smaller capacitors, thereby reducing the stored energy, in comparison with the Greinacher circuit. Accordingly, less damage will occur to the load in the case of a break-down. Moreover, the energy stored in the capacitors of the circuit is not directly accessible under very fast break-down conditions, such as those existing in an evacuated accelerator tube, because of the series inductors which are utilized therein. The internal impedance of the circuit of the invention is relatively low and provides for better voltage regulation than do conventional rectifier-multiplier chain circuits.

DESCRIPTION OF THE INVENTION

The invention can be described in more detail with the help of the accompanying drawings wherein FIG. 1 shows a conventional dual-chain, Cockroft-Walton, or Greinacher, circuit of the prior art;

Figure 1:
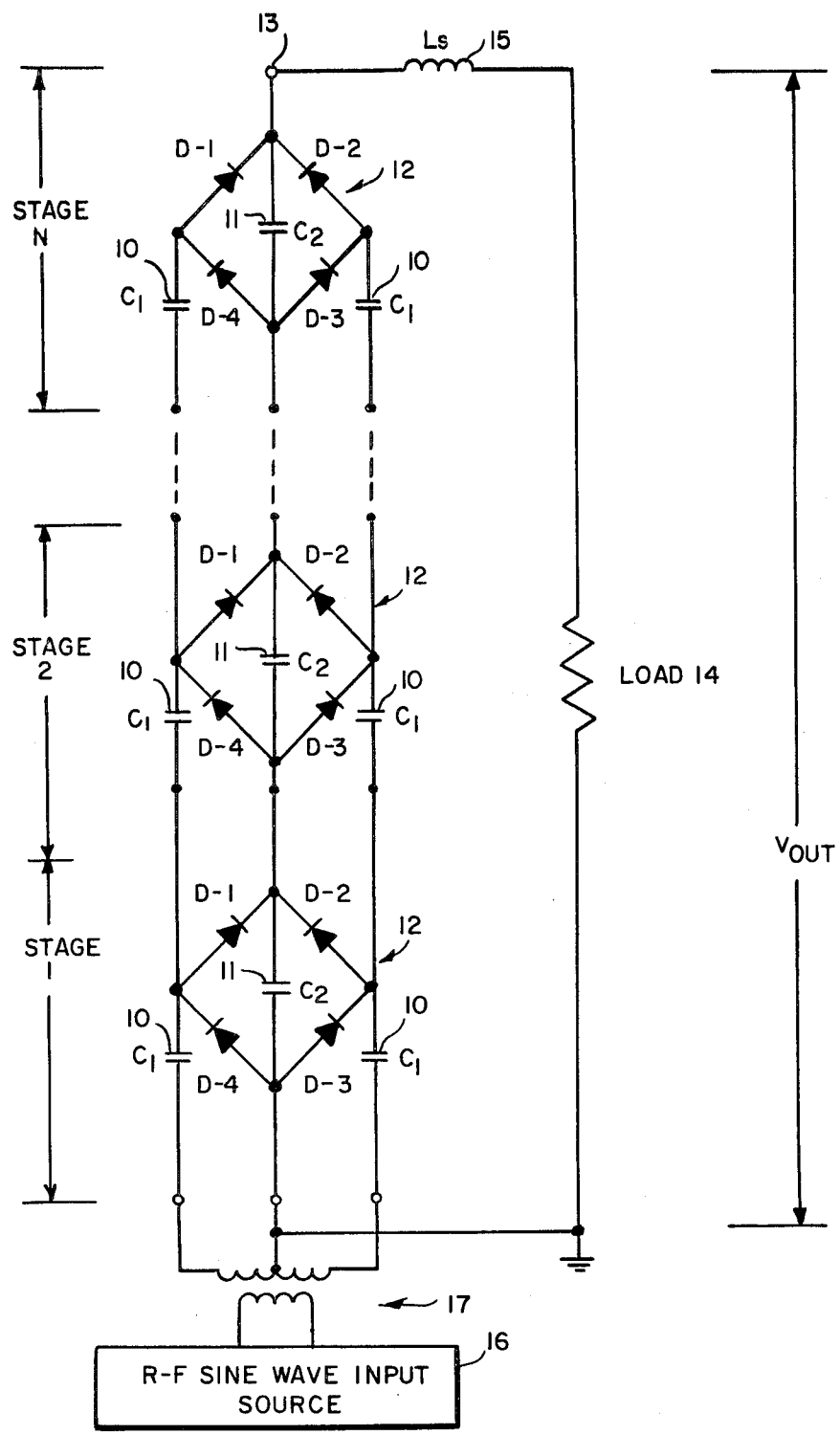

As mentioned above, FIG. 1 shows a basic dual-chain, Greinacher circuit of the prior art in which each of the stages includes side-string capacitances 10 and middle-string capacitances 11 and bridge rectifier circuits 12. An output terminal 13 provides the desired output voltage $V_{out}$ across a load 14 to ground. A series inductance ($L_s$) 15 may be utilized to reduce the current surge under sparking conditions (i.e., where a short circuit to ground temporarily occurs across the load) and, in conjunction with the capacitance of the load or cable to reduce the ripple. The multiplier chain is supplied with an input AC voltage which as shown here is obtained from an R-F sine wave input source 16 via transformer 17, the secondary grounded center tap of which is connected to the middle-string of the chain and the outer ends of the secondary of transformer 17 are connected to the side-string capacitances 10.

Figure 2:
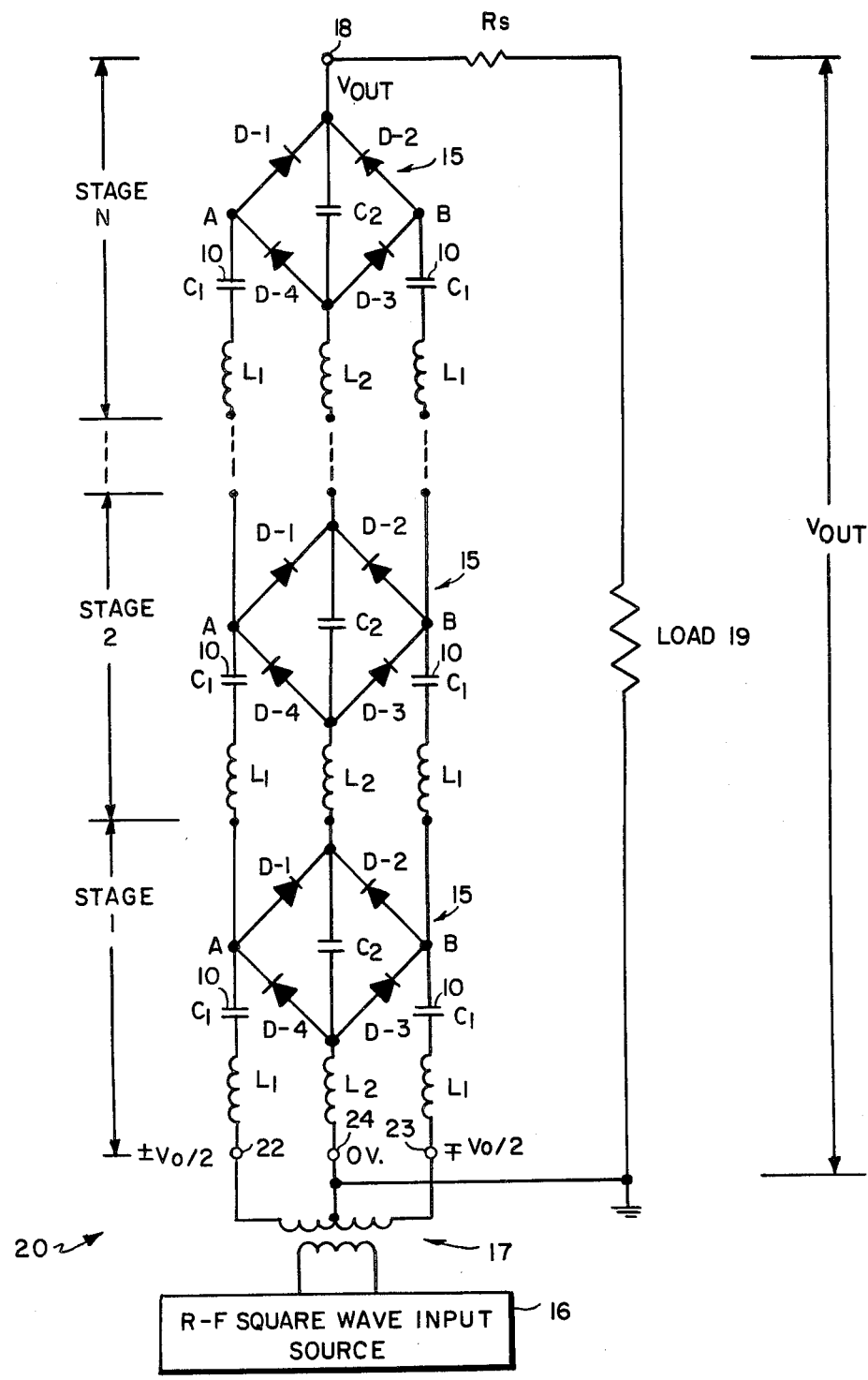
FIG. 2 shows a modified dual-chain multiplier circuit in accordance with a preferred embodiment of the invention.

A modified dual-chain multiplier circuit 20 in accordance with the invention is shown in FIG. 2, wherein each basic stage thereof comprises side-string-capacitance $C_1$ and a middle-string capacitance $C_2$ connected to a bridge rectifier circuit 15 as shown. Inductances $L_1$ are connected in series with side-string capacitances $C_1$, while inductance $L_2$ is connected in series with middle-string capacitance $C_2$. An AC input voltage is supplied from an R-F square-wave input source 16 via transformer 17, while a DC output voltage is produced at output terminal 18 across a load 19 to ground.

Ideally, the input voltage should be a square wave having a value $\pm V_o$ and a frequency which is selected so that the first harmonic $f = \omega/2\pi$ is in resonance with the series circuit $L_1$, $C_1$, i.e., $$\omega^2 L_1 C_1 = 1 \tag{1}$$

If it is assumed, for the moment, that $L_1$ is very large and $C_1$ is correspondingly small, such that condition (1) is fulfilled, only a sinusoidal current can pass through the two $L_1$-$C_1$ side-string circuits of the connected stages. If it is further assumed that these series resonance circuits have no losses, then the impedance of the side-string for the first harmonic is zero. The first harmonic of the voltage across the terminals A,B of bridge rectifier 15 must, therefore, be the same as the first harmonic across the input terminals 22,23 (i.e., across the secondary of transformer 17). Furthermore, only a first-harmonic current can flow in the side-string ($L_1$ large). Since the current flowing is sinusoidal the diodes D-1 through D-4, considered as ideal switches, must open and close pair-wise every half cycle in phase with the driving voltage across the terminals 22, 23.

Assume further, for the moment, that the capacitor $C_2$ is very large. The voltage across it is then virtually constant. The switches connect this constant voltage source to the terminals A and B, reversing polarity every half-cycle. The voltage across terminals A and B is therefore virtually a square wave. The voltages across terminals 22 and 23 and across terminals A and B are both square waves, and since, as stated above, they have, ideally, the same first harmonic, they must, again, ideally, be identical. Such operation means that the voltage produced across the buffer capacitor $C_2$ is approximately equal to $V_0$ and that the input voltage to stage 2 of the generator is a square wave of approximately the same amplitude as for stage 1, the input to stage 3 is of approximately the same amplitude as for stage 2, and so on.

Figure 3:
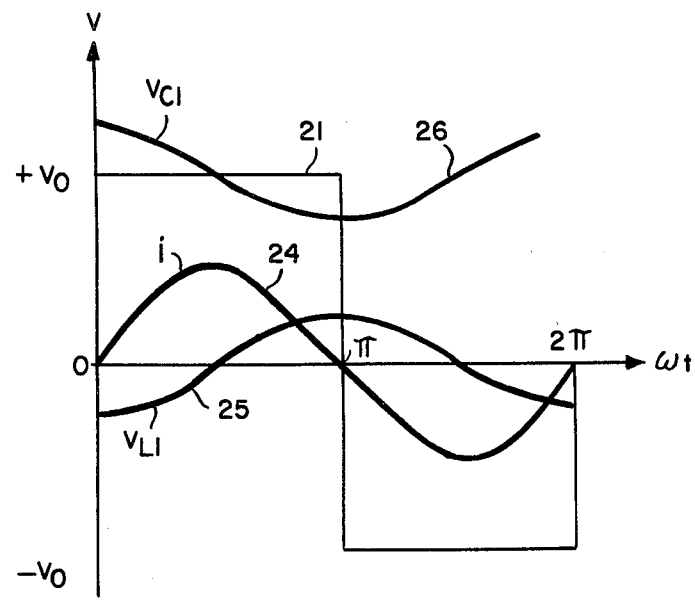
FIG. 3 shows the voltage and current wave forms as a function of time in a single ideal stage of the circuit of FIG. 2.

Again, for an ideal circuit, a removal of the condition that $L_1$ be large and $C_1$ be small has very little effect on the behavior of the circuit as long as condition (1) is fulfilled. There is virtually no AC voltage difference between points A and 22, for instance, and therefore no potential difference to drive anything but a sinusoidal resonance current through the elements $L_1$, $C_1$. Such situation is graphically illustrated in FIG. 3. The square wave 21 is the input voltage across terminals 22 and 23 and, therefore, is also approximately the voltage across terminals A and B. The current 24 is sinusoidal and so are the voltages $V_{L1}$ and $V_{C1}$ (voltages 25 and 26) across the inductor L and capacitor $C_1$, respectively, but ninety degrees out of phase with the current 24. It should be noted that the AC voltage 26 across the capacitor in this steady-state condition is a maximum at the start of the cycle. It is the AC component of this voltage, rather than a voltage difference between terminals 22 and A that starts the current buildup through the inductor $L_1$.

The DC voltage across capacitors $C_1$ is $V_{C1} \approx V_o$, as indicated in FIG. 2, except in unit 1 where it is $V_{C1} \approx V_o/2$, when the lower DC terminal is connected to the center-tap of the transformer as shown.

The center-tap on the transformer in FIG. 1 and FIG. 2 is not necessary to achieve proper operation of either of these two types of power supplies. The center-tap does, however, provide a convenient point for defining the DC potential of the transformer secondary. If it is omitted there are certain implications for the non-destructive discharge of the supply during breakdown, discussed in detail below.

The square wave primary source 16 can be fabricated as a square-wave circuit using transistors or silicon-controlled rectifiers as switches, as would be known to those in the art, with minimum power loss. The efficiency of the overall power supply of the invention is high. The use of sinusoidal currents in each of the stages is much better than the use of sharp current peaks, as in Greinacher circuits.

It is evident from the preceding discussion that, in the ideal situation, there is no drop in voltage from stage to stage. With N stages connected as shown, the total DC voltage developed between input terminal 24 and output terminal 18 of FIG. 2 is then $$V_{OUT} = NV_O \tag{2}$$

and is independent of the current. In other words, the internal impedance of the supply is ideally zero.

Figure 4:
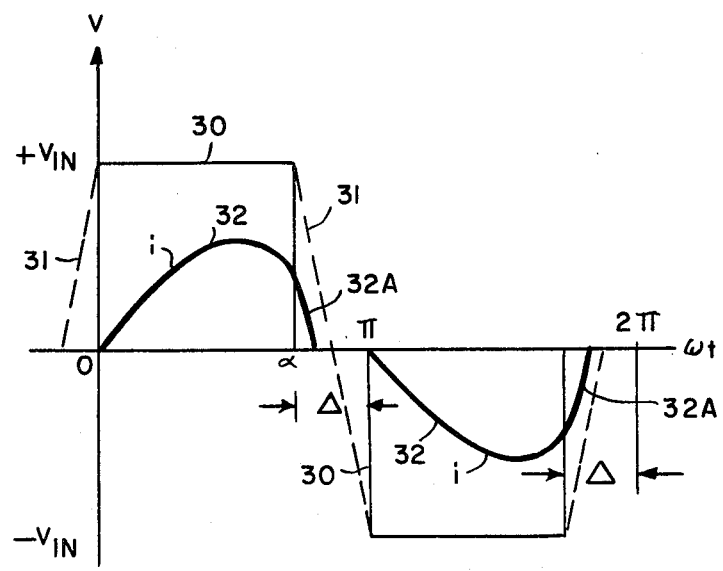
FIG. 4 shows the voltage and current wave forms as in FIG. 3 wherein the input R-F voltage has shorter voltage pulses.

In practice, of course, there are power losses in all components and accompanying voltage drops from stage to stage. There is also a contribution to the effective internal impedance, not accompanied by power losses, from a non-ideal primary square wave form. In practice, the latter contribution is likely to be the most significant one. The simplest case for analysis is one where the primary wave form is as shown in FIG. 4. As shown therein, the voltage curve 30 is constant from $\omega t=0$ to $\omega t=\alpha$, where $\alpha$ is an angle which is less than $\pi$ radians by an amount equal to $\Delta$ radians, i.e.

$$\alpha = \pi - \Delta \tag{3}$$

Such voltage function may be regarded as a limiting case resulting in a higher impedance than for a case which is more likely to occur in practice and is illustrated by the curve 31.

The current 32 is sinusoidal from $\omega t=0$ to $\omega t=\alpha$, but then falls to zero through a much steeper curve 32A (also sinusoidal). The analysis of this situation is straight forward and leads to the following approximate result for the first stage, assuming $\Delta << 1$ radian. Thus, the voltage across buffer capacitor $C_2$ is $$V_{C2} = V_O - (I_1\Delta^2/4\pi f C_1) \tag{4}$$

where $I_1$ is the amplitude of the current i in the LC circuit of the first unit. If there are N stages, this amplitude is related to the DC current delivered by the supply approximately by the expression:

$$I_1 = (N\pi/2)I_{DC} \tag{5}$$

In successive stages, in the above expression, N is replaced with $N-1, N-2, \ldots$ etc. Inserting Equation (5) into Equation (4) leads to $$V_{C2} = V_O - (N\Delta^2/8 f C_1)I_{DC} = V_O - NrI_{DC} \tag{6}$$

for the first stage (where $r=\Delta^2/8 f C_1$). The sum of all voltages $V_{C2}$ from stage to stage is the total DC output voltage. The input voltage of a given stage is the voltage $V_{C2}$ from the preceding stage. The total voltage can therefore be calculated as follows:

Stage 1: $V_{C2} = V_O - NrI_{DC}$,

Stage 2: $V_{C2} = V_O - NrI_{DC} - (N-1)rI_{DC}$.

Stage 3:
$V_{C2} = V_O - NrI_{DC} - (N-1)rI_{DC} - (N-2)rI_{DC}$, etc.

The current flowing in the LC circuit is reduced from stage to stage as the factor $(N-1)$. The total voltage is found by summing over all N units. The result is $$V_{OUT} = NV_O - rI_{DC}[N^2 + (N-1)^2 + (N-2)^2 + \ldots + 1] \tag{7}$$

$$= NV_O - \frac{(2N^3 + 3N^2 + N)\Delta^2}{48 f C_1} = NV_O - R_i I_{DC}$$

As an example, consider a high voltage power supply with $N=8$, $V_O=16$ kV, $f=50$ kHz, $\Delta=0.3$, and $C_1=0.01$ $\mu$F. The internal impedance, as given by Equation (7), is $R_i=4590\Omega$. The no-load voltage is 128 kV, and for a current $I_{DC}=150$ mA the voltage drop is $\Delta V=689$ volts or 0.54 percent. The peak current in the inductors and capacitors of the first stage is 1.88 amps and the peak voltage across each component is 600 volts The inductor $L_1$ is 1.01 mH and in bulk considerably smaller than the capacitor $C_1$. The peak-to-peak ripple across $C_2$, assuming $C_2=C_1=0.01$ $\mu$F, is calculated to be 31.5 volts, which is only 0.2 percent of the DC voltage. Hence, the assumption made earlier that $C_2$ is "large" is reasonable in this case. The ripple frequency is, of course, the second harmonic 2f with some relatively weak higher harmonics.

The circuit shown in FIG. 2 produces a positive high voltage at terminal 18 if terminal 24 is grounded. Obviously, the diodes can be reversed to produce a negative high voltage. Alternatively, each stage can be reversed, a configuration which is equivalent to driving the supply from the top rather than from the bottom, as shown.

The inductors $L_2$ in FIG. 2 are not necessary for the operation of the device as described above. They may be included in some applications, however, since they will serve to reduce the ripple voltage. As described below, they also have an important function in reducing the short-circuit current in the case of a breakdown in the load. The filtering action of $L_2$ depends upon the capacitance to ground of the terminal or cable and load. As discussed further below, it may be advantageous to make $L_2C_2=L_1C_1$ which means that $L_2$ is quite small. If the terminal or cable capacitance (assume a capacitance $C_3$) is low, it is important to assure that the circuit consisting of N $L_2$'s and $C_2$'s combined with $C_3$ does not produce a series resonance condition for the second harmonic 2f. Such series resonance condition can be prevented by using an extra filtering inductor (not shown) in the high-voltage lead and this will also serve to reduce the short-circuit current.

For most applications the components of the power supply are chosen such that the AC voltage across capacitors $C_1$ is small compared to $V_o$. It then becomes possible to reduce the number of inductors $L_1$, for instance, by eliminating the inductances in alternating stages, for example, and increasing the inductance values in the remaining stages accordingly such that the resonance condition (Equation (1) above) is substantially fullfilled for the total impedance of the full length of each side-string.

For very many applications the high voltage is occasionally short-circuited, for instance, by a breakdown of a high-voltage accelerating gap or accelerating tube. In particular, if the breakdown occurs in vacuum, it is exceedingly fast (a "picoseconds" wavefront). It is always important to limit the stored energy extractable from the power supply in such a breakdown. The inductors $L_2$ tend to serve this purpose by limiting the current that can be instantaneously extracted from the buffer capacitors $C_2$.

Figure 5:
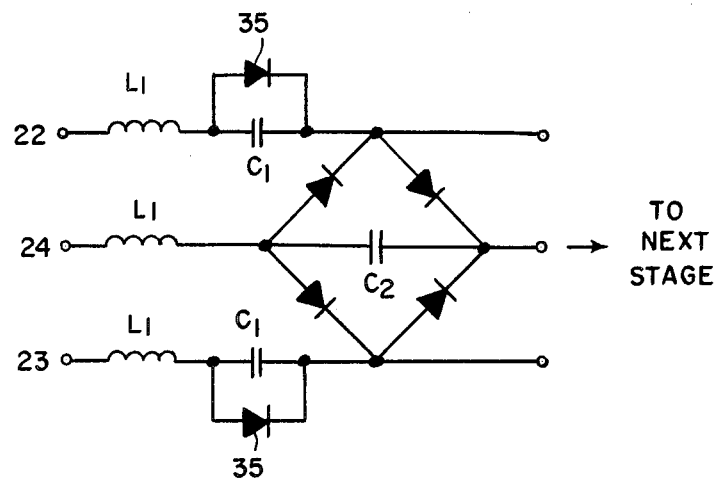
FIG. 5 shows a single stage of the circuit of FIG. 2 but with two protection diodes added.

When in a break-down, the high-voltage lead 18 in FIG. 2 is short-circuited to the ground lead 24, each of the capacitors $C_1$ and $C_2$ are presumably charged to a voltage $V_o$. Therefore, each of the inductors $L_1$ and $L_2$ will experience a voltage drop $V_o$. The short circuit current will build up sinusoidally for the side-strings, through the two diodes D-1 and D-2 in the last stage. After one half cycle the capacitors are discharged, but the current continues to flow. For the middle line, the capacitors are bypassed by the diodes which will prevent a negative voltage buildup across the capacitors $C_2$. The current will then decay exponentially. In the two side-strings there are no diodes in parallel with the capacitors $C_1$. To facilitate a smooth decay, an alternative configuration can be used wherein diodes 35 are connected across the capacitors $C_1$, as shown in FIG. 5. These diodes have to carry a maximum surge current of $$I_{surge} = V_O/L \tag{8}$$

Each of the two diodes D-1 and D-2 in the last stage have to carry the surge current in a side-string as well as half the current in the middle-string, i.e., 50 percent more than diodes 35, assuming $C_1 = C_2$ and $L_1 = L_2$. For the example given above this total surge current is $I_{surge} = 75.6$ amp. If the diodes D-1 and D-2 cannot carry this current, a surge resistor $R_s$ (or a suitable inductor), capable of carrying the full high voltage for a short time, must be inserted in the high-voltage lead, as shown in FIG. 2.

Figure 6:
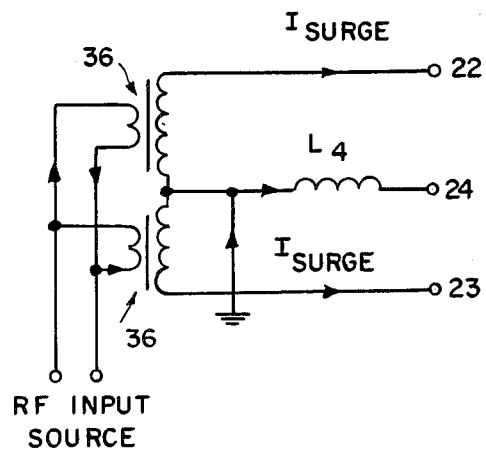
FIG. 6 shows a further alternative embodiment of the input portion of the circuit of FIG. 2.

As shown in FIG. 2, the input voltage is supplied via a high-frequency transformer with center-tap secondary. Alternatively, such voltage can be supplied via two or more transformers 36 with parallel primaries, as depicted in FIG. 6 for the case of two transformers. If the transformers 36 are identical and the surge currents $I_{surge}$ in the left and right side-strings are equal, as shown, there will be no induced over-voltage across the terminals connected to the RF input source. The leakage inductance of the input transformers must be small so as to limit the voltage across the secondary during a surge. To ensure uniform discharge of the three input lines, it is beneficial in some applications to insert an additional inductor $L_4$ as shown in FIG. 6. Inductor $L_4$ should be made substantially equal to the leakage inductance in the transformers.

As mentioned above the center-tap of the secondary or secondaries is not necessary for the correct operation of the device. It merely provides a convenient point for defining the DC potential of the secondary. This can also be done by other means easily devised by those skilled in the art. If point 24 of FIG. 1 is not connected to a center-tap on the secondary or secondaries, for example, the surge current in the side-strings will pass through diodes D-3 and D-4 and inductor $L_2$ of the first stage. These components must be dimensioned accordingly.

For some applications, such as injectors for pulsed accelerators, and the like, a very heavy current is drawn from the capacitors during the pulse. The capacitors $C_2$ in FIG. 2 can in principle be made arbitrarily large, and the inductors $L_2$ can be eliminated for such applications.

Thus, as can be seen in the above discussion, the modified Greinacher configuration of the invention provides the advantages of rectifier-multiplier chain operation without the disadvantages of the conventional Greinacher circuits of the prior art. Moreover, the circuit of the invention is relatively simple in configuration and is relatively inexpensive, and does not require low component tolerances, in comparison with the alternative configurations discussed above with respect to the traveling wave configuration, the standing wave configuration, and the cascade transformer configuration of the prior art.

The overall circuitry shown in FIG. 2 can be fabricated in a relatively small package for many applications depending on the frequency and the output voltage required, and depending on the number of stages which are needed to produce such output voltage.

While the configuration discussed with reference to FIGS. 2-6 depict preferred embodiments of the invention, modifications thereto within the spirit and scope of the invention may occur to those in the art and the invention is not to be deemed as limited to the particular embodiments described above, except as defined by the appended claims.

What is claimed is:

1. A power supply for producing a DC output voltage comprising
   a plurality of serially-connected voltage producing stages including a first stage, a final stage, and intermediate stages therebetween, each of said stages including
   bridge rectifier means having first and second side-string terminals and first and second center-string terminals;
   a first circuit having series-connected, side-string capacitance and inductance means;
   a second circuit having series-connected, side-string capacitance and inductance means; and
   center-string capacitance means connected between said center-string terminals;
   an AC input voltage source, having a pair of output terminals for supplying an AC voltage having a substantially square wave shape;
   the first circuit of said first stage connected between one of the output terminals of said AC input voltage source and the first side-string terminal of the first stage bridge rectifier means;
   the second circuit of said first stage connected between the other of the output terminals of said AC input voltage source and the second side-string terminal of the first stage bridge rectifier means;
   the first center-string terminal of the bridge rectifier means of said first stage being connected to a first DC output terminal;
   the first circuit of each successive stage connected between the first side-string terminal of its bridge rectifier means and the first side-string terminal of the bridge rectifier means of the preceding stage;
   the second circuit of each successive stage being connected between the second side-string terminal of its bridge rectifier means and the second side-string terminal of the bridge rectifier means of the preceding stage;

center-string inductance means connected from the first center-string terminal of the bridge rectifier means of each successive stage to the second center-string terminal of the bridge rectifier means of the preceding stage and from the first center-string terminal of said first stage to the first DC output terminal;

the product of the values of the inductance means and the capacitance means of said first and second circuits of each of said stages and the product of the values of the center-string capacitance means and the center-string inductance means of each of said stages being selected to be substantially equal;

the center-string terminal of the bridge rectifier means of the final stage providing a second DC output terminal.

2. A power supply in accordance with claim 1 wherein the frequency of said square wave voltage is selected so that the first harmonic thereof is substantially in resonance with said first and second circuits.

3. A power supply in accordance with claim 1 wherein the values of the center-string capacitances of each stage are substantially greater than the values of the capacitances in the first and second circuits of each stage.

4. A power supply in accordance with claim 1 wherein the values of the center-string capacitances of each stage are substantially equal to the values of the capacitances in the first and second circuits of each stage.

5. A power supply for producing a DC output voltage comprising a plurality of serially-connected voltage producing stages including a first stage, a final stage, and intermediate stages therebetween, each of said stages including bridge rectifier means having first and second side-string terminals and first and second center-string terminals;

a first circuit having series-connected, side-string capacitance and inductance means and diode means connected in parallel with said side-string capacitance;

a second circuit having series-connected, side-string capacitance and inductance means and diode means connected in parallel with said side-string capacitance; and center-string capacitance means connected between said center-string terminals;

an AC input voltage source, having a pair of output terminals for supplying an AC voltage having a substantially square wave shape;

the first circuit of said first stage connected between one of the output terminals of said AC input voltage source and the first side-string terminal of the first stage bridge rectifier means;

the second circuit of said first stage connected between the other of the output terminals of said AC input voltage source and the second side-string terminal of the first stage bridge rectifier means;

the first center-string terminal of the bridge rectifier means of said first stage being connected to a first DC output terminal;

the first circuit of each successive stage connected between the first side-string terminal of its bridge rectifier means and the first side-string terminal of the bridge rectifier means of the preceding stage;

the second circuit of each successive stage being connected between the second side-string terminal of its bridge rectifier means and the second side-string terminal of the bridge rectifier means of the preceding stage;

means for interconnecting the first center-string terminal of the bridge rectifier means of each successive stage to the second center-string terminal of the bridge rectifier means of the preceding stage;

the center-string terminal of the bridge rectifier means of the final stage providing a second DC output terminal.

6. A power supply in accordance with claim 1 or 5 and further including a surge resistor connected in series with the second center-string terminal of said final stage for preventing damage to the bridge rectifier means.

7. A power supply in accordance with claim 1 or 5 wherein said AC input voltage source comprises a square wave voltage source;

transformer means having a primary responsive to the square wave output from said square wave source and means for defining the DC potential of the secondary of said transformer means.

8. A power supply in accordance with claim 1 or 5 wherein said AC input voltage source comprises a square wave voltage source;

transformer means comprising a pair of transformers the primaries of which are connected in parallel and are responsive to the square wave output of said square wave source and the secondaries of which have commonly connected terminals connected to the first DC output terminal, the other terminals of each of said secondaries forming the output terminals of said AC input voltage source.

9. A power supply in accordance with claim 7 wherein the secondary of said transformer means has a center terminal and further including an additional inductance means connected between said center terminal and the first center-string terminal of said input stage.

10. A power supply in accordance with claim 9 wherein the value of said additional inductance means is substantially equal to the value of the leakage inductance of said transformer means.

11. A power supply in accordance with claim 1 or 5 wherein the first and second circuit of only a selected number of said stages include inductance means, said selected number being less than the total number of said stages, and the values of the inductance means and capacitance means in the side-strings of said stages being selected so that the total impedance of each side-string is substantially in series resonance with the first harmonic of the square wave input AC voltage.

12. A power supply in accordance with claim 11 wherein the first and second circuits of alternating stages include inductance means and the first and second circuits of intervening stages do not include inductance means.

13. A power supply in accordance with claim 8 and further including an additional inductance means connected between said commonly connected terminals and the first center-string terminal of said input stage.

14. A power supply in accordance with claim 13 wherein the value of said additional inductance means is substantially equal to the value of the leakage inductance of said transformer means.

* * * * *